US012693784B2

(12) United States Patent
 Ahn

(10) Patent No.: US 12,693,784 B2
(45) Date of Patent: Jul. 28, 2026

(54) STORAGE DEVICE, COMPUTING SYSTEM AND PROXIMITY DATA PROCESSING MODULE WITH IMPROVED EFFICIENCY OF MEMORY BANDWIDTH

(71) Applicant: SK hynix Inc., Icheon-si (KR)

(72) Inventor: Tae Young Ahn, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 373 days.

(21) Appl. No.: 18/180,382

(22) Filed: Mar. 8, 2023

(65) Prior Publication Data

US 2024/0126444 A1      Apr. 18, 2024

(30) Foreign Application Priority Data

Oct. 13, 2022      (KR) ........................ 10-2022-0131068

(51) Int. Cl.
 *G06F 3/06*            (2006.01)
(52) U.S. Cl.
 CPC .......... *G06F 3/0613* (2013.01); *G06F 3/0659* (2013.01); *G06F 3/0673* (2013.01)
(58) Field of Classification Search
 CPC ..... G06F 3/0613; G06F 3/0659; G06F 3/0673
 See application file for complete search history.

(56) References Cited

U.S. PATENT DOCUMENTS

| 7,376,950 | B2 * | 5/2008 | Wolrich | .............. | G06F 13/4234 |
| | | | | | 710/24 |
| 9,529,710 | B1 * | 12/2016 | Jones | .................. | G06F 12/0607 |
| 2012/0023282 | A1 | 1/2012 | Rub | | |
| 2017/0003898 | A1 * | 1/2017 | Matsumura | ........... | G06F 3/0689 |
| 2022/0121565 | A1 | 4/2022 | Kao et al. | | |

FOREIGN PATENT DOCUMENTS

| KR | 10-2017-0133090 A | 12/2017 |
| KR | 10-2022-0120967 A | 8/2022 |

OTHER PUBLICATIONS

Adisechu et al., A Reliable and Scalable Striping Protocol, 1996, ACM, 11 pages (Year: 1996).*
Office Action/Rejection issued by Korean Patent office, in counterpart Patent Application KR10-2022-0131068, on Apr. 3, 2026.

* cited by examiner

*Primary Examiner* — Gary W. Cygiel

(57)      ABSTRACT

A method is provided in which a core processor located adjacent to a memory and processing data of the memory in a proximity data processing scheme reads and processes the data of the memory by simultaneously using a plurality of channels used by the memory. Since data processing is performed simultaneously using a total bandwidth between the memory and the core processor, the efficiency of the proximity data processing scheme by the core processor may be improved.

20 Claims, 13 Drawing Sheets

|  | Ch0 | | Ch1 | | Ch2 | | Ch3 | | |
|---|---|---|---|---|---|---|---|---|---|
| | 0x0_0000_0000 | 0x0_0000_0000 | 0x0_0000_0040 | 0x4_0000_0000 | 0x0_0000_0080 | 0x8_0000_0000 | 0x0_0000_00C0 | 0xC_0000_0000 | |
| | 0x0_0000_0100 | 0x0_0000_0040 | 0x0_0000_0140 | 0x4_0000_0040 | 0x0_0000_0180 | 0x8_0000_0040 | 0x0_0000_01C0 | 0xC_0000_0040 | |
| | 0x0_0000_0200 | 0x0_0000_0080 | 0x0_0000_0240 | 0x4_0000_0080 | 0x0_0000_0280 | 0x8_0000_0080 | 0x0_0000_02C0 | 0xC_0000_0080 | 16GB |
| | 0x0_0000_0300 | 0x0_0000_00C0 | 0x0_0000_0340 | 0x4_0000_00C0 | 0x0_0000_0380 | 0x8_0000_00C0 | 0x0_0000_03C0 | 0xC_0000_00C0 | |
| | ⋮ | | ⋮ | | ⋮ | | ⋮ | | |
| | 0x4_0000_0000 | 0x1_0000_0000 | 0x4_0000_0040 | 0x5_0000_0000 | 0x4_0000_0080 | 0x9_0000_0000 | 0x4_0000_00C0 | 0xD_0000_0000 | |
| | 0x4_0000_0100 | 0x1_0000_0040 | 0x4_0000_0140 | 0x5_0000_0040 | 0x4_0000_0180 | 0x9_0000_0040 | 0x4_0000_01C0 | 0xD_0000_0040 | 16GB |
| | 0x4_0000_0200 | 0x1_0000_0080 | 0x4_0000_0240 | 0x5_0000_0080 | 0x4_0000_0280 | 0x9_0000_0080 | 0x4_0000_02C0 | 0xD_0000_0080 | |
| | 0x4_0000_0300 | 0x1_0000_00C0 | 0x4_0000_0340 | 0x5_0000_00C0 | 0x4_0000_0380 | 0x9_0000_00C0 | 0x4_0000_03C0 | 0xD_0000_00C0 | |
| | ⋮ | | ⋮ | | ⋮ | | ⋮ | | |
| | 0x8_0000_0000 | 0x2_0000_0000 | 0x8_0000_0040 | 0x6_0000_0000 | 0x8_0000_0080 | 0xA_0000_0000 | 0x8_0000_00C0 | 0xE_0000_0000 | |
| | 0x8_0000_0100 | 0x2_0000_0040 | 0x8_0000_0140 | 0x6_0000_0040 | 0x8_0000_0180 | 0xA_0000_0040 | 0x8_0000_01C0 | 0xE_0000_0040 | 16GB |
| | 0x8_0000_0200 | 0x2_0000_0080 | 0x8_0000_0240 | 0x6_0000_0080 | 0x8_0000_0280 | 0xA_0000_0080 | 0x8_0000_02C0 | 0xE_0000_0080 | |
| | 0x8_0000_0300 | 0x2_0000_00C0 | 0x8_0000_0340 | 0x6_0000_00C0 | 0x8_0000_0380 | 0xA_0000_00C0 | 0x8_0000_03C0 | 0xE_0000_00C0 | |
| | ⋮ | | ⋮ | | ⋮ | | ⋮ | | |
| | 0xC_0000_0000 | 0x3_0000_0000 | 0xC_0000_0040 | 0x7_0000_0000 | 0xC_0000_0080 | 0xB_0000_0000 | 0xC_0000_00C0 | 0xF_0000_0000 | |
| | 0xC_0000_0100 | 0x3_0000_0040 | 0xC_0000_0140 | 0x7_0000_0040 | 0xC_0000_0180 | 0xB_0000_0040 | 0xC_0000_01C0 | 0xF_0000_0040 | 16GB |
| | 0xC_0000_0200 | 0x3_0000_0080 | 0xC_0000_0240 | 0x7_0000_0080 | 0xC_0000_0280 | 0xB_0000_0080 | 0xC_0000_02C0 | 0xF_0000_0080 | |
| | 0xC_0000_0300 | 0x3_0000_00C0 | 0xC_0000_0340 | 0x7_0000_00C0 | 0xC_0000_0380 | 0xB_0000_00C0 | 0xC_0000_03C0 | 0xF_0000_00C0 | |
| | ⋮ | | ⋮ | | ⋮ | | ⋮ | | |

|  | Input | Output | | | |
|---|---|---|---|---|---|
|  |  | Ch 0 | Ch 1 | Ch 2 | Ch 3 |
| Addr | 0x0_0000_0240 | 0x0_0000_00C0 | 0x4_0000_0080 | 0x8_0000_0080 | 0xC_0000_0080 |
| Len | 4 | 1 | 1 | 1 | 1 |
| Size | 64B | 64B | 64B | 64B | 64B |

|  | Input | Output | | | |
|---|---|---|---|---|---|
|  |  | Ch 0 | Ch 1 | Ch 2 | Ch 3 |
| Addr | 0x4_0000_0080 | 0x1_0000_0040 | 0x5_0000_0040 | 0x9_0000_0000 | 0xD_0000_0000 |
| Len | 10 | 2 | 2 | 3 | 3 |
| Size | 64B | 64B | 64B | 64B | 64B |

FIG.10

STORAGE DEVICE, COMPUTING SYSTEM AND PROXIMITY DATA PROCESSING MODULE WITH IMPROVED EFFICIENCY OF MEMORY BANDWIDTH

CROSS-REFERENCE TO RELATED APPLICATION

The present application claims priority under 35 U.S.C. § 119(a) to Korean Patent Application No. 10-2022-0131068 filed in the Korean Intellectual Property Office on Oct. 13, 2022, which is incorporated herein by reference in its entirety.

BACKGROUND

1. Technical Field

Various embodiments generally relate to a storage device, a computing system, and a proximity data processing module with improved memory bandwidth efficiency.

2. Related Art

A storage device is a device that stores data on the basis of a request of a host such as a computer, a mobile terminal such as a smartphone or a tablet, or various electronic devices. The host may store data in the storage device or read and process data stored in the storage device.

Difficulties arise when problems occur in data processing performance due to a limited bandwidth between the host and the storage device.

SUMMARY

Various embodiments are directed to providing measures capable of improving the efficiency of a bandwidth used by a memory included in a storage device and to improving the performance of processing data stored in the memory.

In an embodiment, a storage device may include: a memory including a plurality of memory cells; a core processor located adjacent to the plurality of memory cells, and configured to access the memory using an N (where N is an integer equal to or greater than 2) number of channels and to process data of the memory; and an internal splitter configured to simultaneously read data through at least two channels from among the N number of channels, merge the simultaneously read data, and to provide the merged data to the core processor.

In an embodiment, a computing system may include: a memory using N (where N is an integer equal to or greater than 2) number of channels; a first splitter configured to, when data is loaded into the memory, provide physical addresses that are allocated in a first direction for each of the N number of channels by converting the physical addresses into logical addresses, which are allocated in a second direction different from the first direction; and a second splitter configured to, when the data loaded into the memory is read, provide physical addresses mapped to the logical addresses.

In an embodiment, a proximity data processing module may include: an internal splitter configured to provide physical addresses mapped to logical addresses for each of a plurality of channels used by a memory; and a core processor configured to read data of the memory simultaneously using the plurality of channels according to the physical addresses, and to perform a calculation according to the data.

According to the embodiments of the disclosed technology, it is possible to improve the use efficiency of a bandwidth of a channel used between a processor and a memory, thereby improving the performance of processing data stored in the memory.

BRIEF DESCRIPTION OF THE DRAWINGS

FIGS. 5 and 6 are diagrams illustrating examples of methods of mapping physical addresses and logical addresses allocated to channels used by a memory in computing systems according to embodiments of the disclosure.

FIGS. 7 and 8 are diagrams illustrating an example of a method of processing data of a memory in a computing system based on an embodiment of the disclosure.

FIGS. 9 and 10 are diagrams illustrating another method of processing data of a memory in a computing system according to an embodiment of the disclosure.

DETAILED DESCRIPTION

Figure 1:
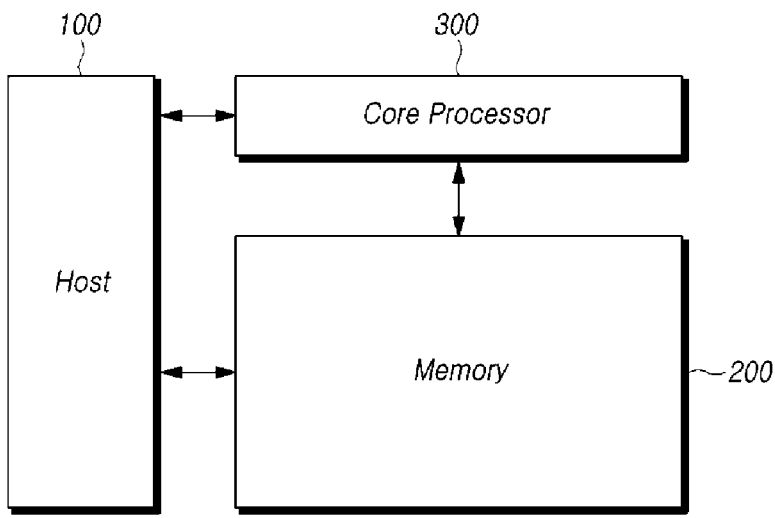
FIG. 1 is a diagram schematically illustrating a configuration of a computing system according to an embodiment of the disclosure.

Hereinafter, embodiments of the present disclosure will be described in detail with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure unclear. It is to be noticed that the terms "comprising," "having," "including" and so on, used in the description and claims, should not be interpreted as being restricted to the means listed thereafter unless specifically stated otherwise. Where an indefinite or definite article is used when referring to a singular noun, e.g., "a," "an" and "the," this may include a plural of that noun unless specifically stated otherwise.

Also, in describing the components of the disclosure, there may be terms used like first, second, A, B, (a), and (b). These are solely for the purpose of differentiating one component from another component but do not limit the substances, order, sequence or number of the components.

In descriptions for the positional relationships of components, where it is described that at least two components are "connected," "coupled" or "linked," it is to be understood that the at least two components may be directly "connected," "coupled" or "linked" but may be indirectly "connected," "coupled" or "linked" with another component interposed between the two components. Here, another component may be included in at least one of the at least two components which are "connected," "coupled" or "linked" with each other.

In descriptions for time flow relationships of components, an operating method or a fabricating method, where pre and post relationships in terms of time or pre and post relationships in terms of flow are described, for example, by "after," "following," "next" or "before," non-continuous cases may be included unless "immediately" or "directly" is used.

When a numerical value for a component or its corresponding information (e.g., level, etc.) is mentioned, even though there is no separate explicit description, the numerical value or its corresponding information can be interpreted as including an error range that may be caused by various factors (for example, a process variable, an internal or external shock, noise, etc.).

Hereinafter, various embodiments of the present disclosure will be described in detail with reference to the accompanying drawings.

FIG. 1 is a diagram schematically illustrating a configuration of a computing system according to an embodiment of the disclosure.

Referring to FIG. 1, a computing system may include, for example, a host 100, a memory 200 and a core processor 300.

The host 100 may control at least a part of the operation of the memory 200 and the operation of the core processor 300.

By a request of the host 100, write (program), read and erase operations on the memory 200 may be performed. By a request of the host 100, data processing by the core processor 300 may be performed.

For example, the host 100 may be a computer, an ultra mobile PC (UMPC), a workstation, a personal digital assistant (PDA), a tablet, a mobile phone, a smartphone, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, one of various electronic devices configuring a home network, one of various electronic devices configuring a computer network, one of various electronic devices configuring a telematics network, an RFID (radio frequency identification) device, a mobility device (e.g., a vehicle, a robot or a drone) capable of driving under human control or autonomous driving, etc.

The host 100 may include at least one operating system (OS). The operating system may generally manage and control the function and operation of the host 100, and may provide interoperability between the host 100 and the memory 200. The operating system may be classified into a general operating system and a mobile operating system depending on the mobility of the host 100.

The host 100 may be a device that is separated from the core processor 300.

The memory 200 may include a plurality of memory blocks. The memory 200 may include a plurality of memory cells that store data. The plurality of memory cells may exist in a memory block.

For example, the memory 200 may be a DDR SDRAM (double data rate synchronous dynamic random access memory), an LPDDR4 (low power double data rate 4) SDRAM, a GDDR (graphics double data rate) SDRAM, an LPDDR (low power DDR) or an RDRAM (Rambus dynamic random access memory). The memory 200 may be implemented in various types such as a NAND flash memory, a 3D NAND flash memory, a NOR flash memory, a resistive random access memory (RRAM), a phase-change random access memory (PRAM), a magnetoresistive random access memory (MRAM), a ferroelectric random access memory (FRAM) and a spin transfer torque random access memory (STT-RAM).

The memory 200 may receive a command and an address from the host 100. The memory 200 may access an area that is selected by the address corresponding to some of the plurality of memory cells. The memory 200 may perform an operation indicated by the command, on the area selected by the address.

For example, the memory 200 may perform a program operation, a read operation and an erase operation. When performing the program operation, the memory 200 may program data to the area selected by the address. When performing the read operation, the memory 200 may read data from the area selected by the address. In the erase operation, the memory 200 may erase data stored in the area selected by the address.

The core processor 300 may exist separately from the host 100 and process data of the memory 200.

The core processor 300 may be located adjacent to the plurality of memory cells that are included in the memory 200. For example, the core processor 300 may be located adjacent to but outside of the memory 200. Alternatively, the core processor 300 may be located inside the memory 200.

The core processor 300 may be located adjacent to the memory 200 and process data of the memory 200. In the present specification, the core processor 300 and the memory 200 may be collectively referred to as a storage device.

Since the core processor 300 processes data of the memory 200 at a location adjacent to the memory 200, the efficiency of data processing may be improved compared to a case where data of the memory 200 is processed only by the host 100.

In addition, embodiments of the disclosed technology may allow the core processor 300 to process data of the memory 200 by simultaneously using a plurality of channels used by the memory 200, thereby improving the performance of processing data of the memory 200 by the core processor 300.

Figure 2:
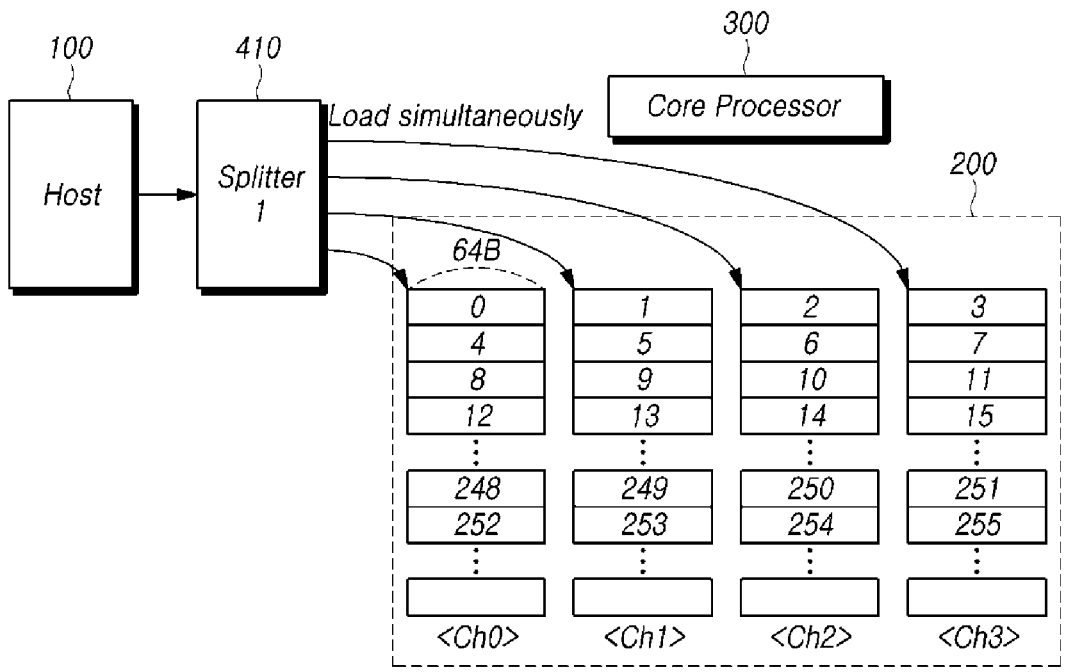
FIG. 2 is a diagram illustrating an example of a configuration of loading data into a memory in a computing system according to an embodiment of the disclosure.
Figure 3:
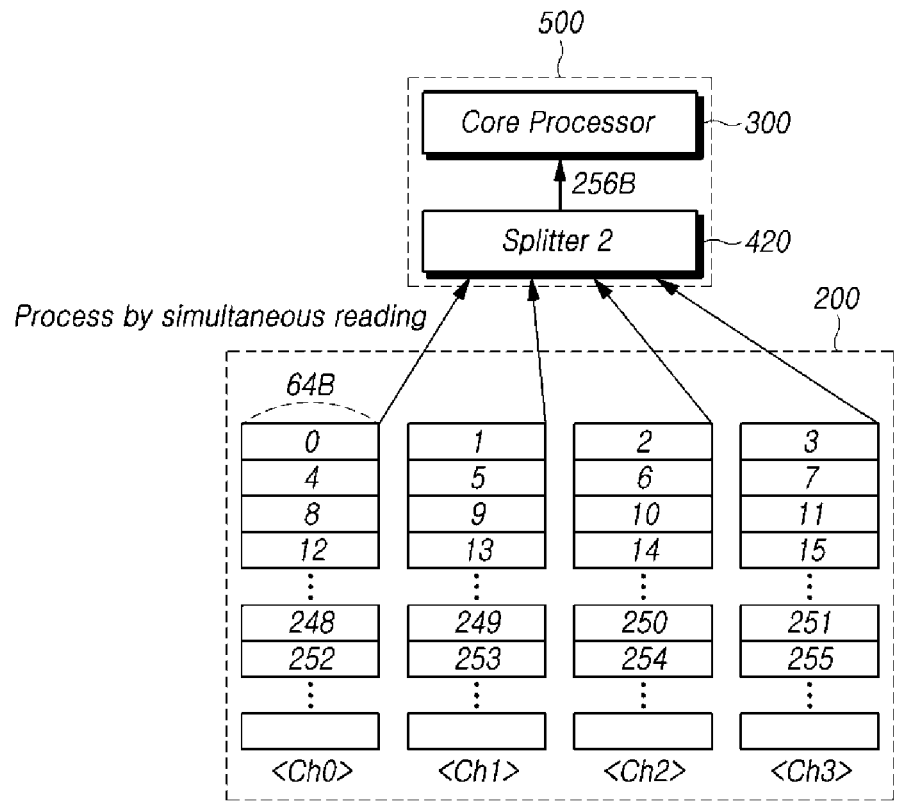
FIG. 3 is a diagram illustrating an example of a configuration of processing data of a memory in a computing system according to an embodiment of the disclosure.
Figure 4A:
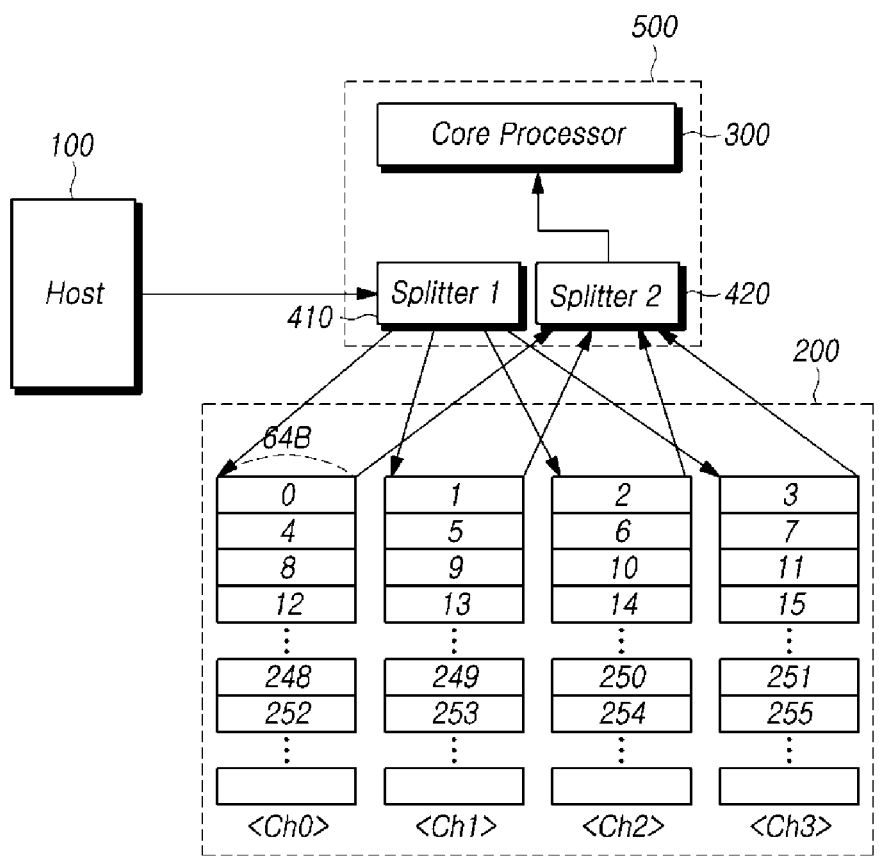
FIGS. 4A and 4B are diagrams illustrating other examples of configurations of loading data into a memory and processing data of a memory in computing systems according to embodiments of the disclosure.
Figure 4B:
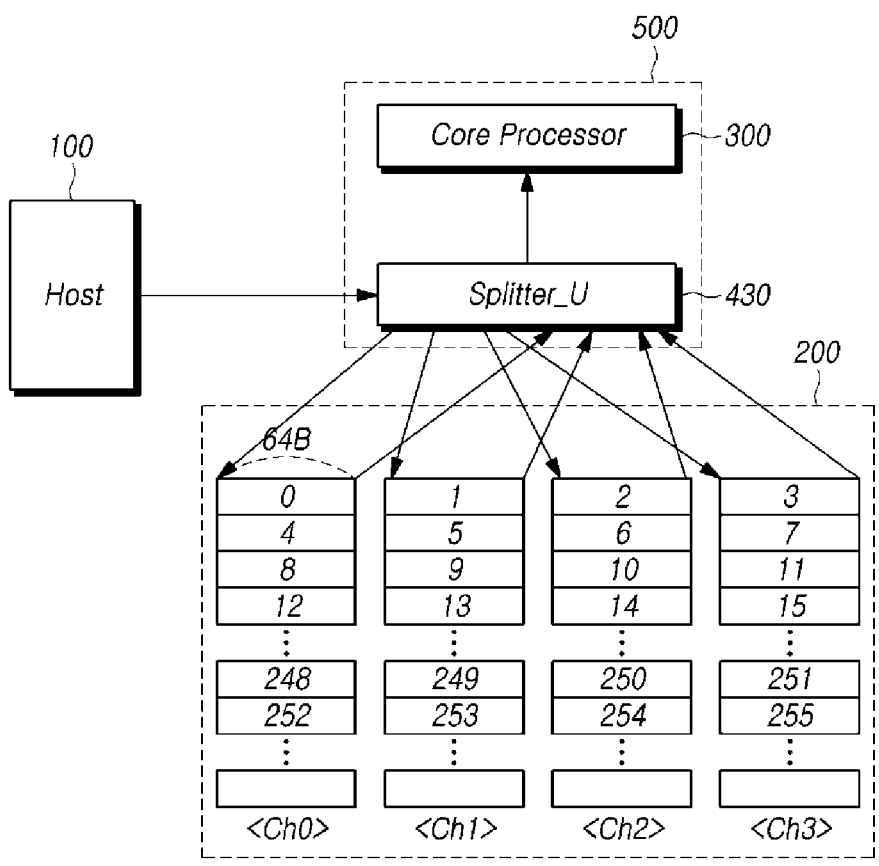

FIG. 2 is a diagram illustrating an example of a configuration of loading data into a memory in a computing system according to an embodiment of the disclosure. FIG. 3 is a diagram illustrating an example of a configuration of processing data of a memory in a computing system according to an embodiment of the disclosure. FIGS. 4A and 4B are diagrams illustrating other examples of configurations of loading data into a memory and processing data of a memory in computing systems according to embodiments of the disclosure.

Referring to FIG. 2, a computing system may include a host 100, a memory 200, a core processor 300 and a first splitter (Splitter 1) 410.

The memory 200 may use N (where N is an integer equal to or greater than 2) number of channels. The host 100 may access the memory 200 and load data by using the N number of channels.

FIG. 2 illustrates a memory 200 that uses four channels Ch0, Ch1, Ch2 and Ch3, and a host 100 that loads data into the memory 200 through the four channels Ch0, Ch1, Ch2 and Ch3. In FIG. 4, a data bus width of each of the four channels Ch0, Ch1, Ch2 and Ch3 is 64 bytes.

Physical addresses may be sequentially allocated to each of the four channels Ch0, Ch1, Ch2 and Ch3, and the host 100 may sequentially load data through each channel. Since data are sequentially loaded through each channel, even when data are read later, the data may be sequentially read through each channel, and thus, the bandwidths of a plurality of channels may not be sufficiently utilized.

In a computing system according to embodiments of the disclosure, the host 100 may load data into the memory 200 by simultaneously using at least two of a plurality of channels used by the memory 200 through the first splitter 410.

For example, the host 100 may split data (e.g., a command) to be loaded into the memory 200 into units of the data bus width, such as the data bus width of each of the N number of channels used by the memory 200. The host 100 may load the data, divided into units of the data bus width, into the memory 200 by simultaneously using at least two channels from among the N number of channels.

Accordingly, the host 100 may access the memory 200 through at least two channels from among the N number of channels, and data may be loaded to addresses that are allocated to the at least two channels, respectively. For example, data split into units of the data bus width may be simultaneously loaded through a zeroth channel Ch0, a first channel Ch1, a second channel Ch2 and a third channel Ch3. Since an N number of channels used by the memory 200 are simultaneously used, the efficiency of using the bandwidth used between the host 100 and the memory 200 may be improved. Data processing speed and performance between the host 100 and the memory 200 may be improved.

Physical addresses that are sequentially allocated to each channel may be converted such that data divided into units of the data bus width may be simultaneously loaded through at least two of the N number of channels.

For example, the first splitter 410 may convert physical addresses allocated to each of the N number of channels in a first direction into logical addresses allocated in a second direction, which is different from the first direction. For example, the first direction may mean a vertical direction and the second direction may mean a horizontal direction, but embodiments of the disclosed technology are not limited thereto.

Since the first splitter 410 converts physical addresses allocated in the vertical direction into logical addresses allocated in the horizontal direction, the N number of channels may be simultaneously used, and data may be simultaneously loaded through the N number of respective channels. For example, as illustrated in FIG. 2, addresses 0 to 3 may be sequentially allocated to four channels used by the memory 200. Data by the host 100 may be simultaneously loaded to the addresses 0 to 3.

Since data such as a command according to a request of the host 100 may be simultaneously loaded through the N number of channels used by the memory 200, data processing performance between the host 100 and the memory 200 may be improved.

The first splitter 410 may be implemented, for example, in the form of a hardware logic inside or outside the host 100. The first splitter 410 may be implemented in the form of an algorithm including a function of converting a physical address into a logical address, a function of dividing a command into units of a data bus width and a function of transmitting the divided command simultaneously through the N number of channels. The first splitter 410 may be mounted to the host 100 by being implemented in the form of an algorithm. Alternatively, the first splitter 410 may be implemented in the form of a chipset separate from the host 100. Since the first splitter 410 is implemented separately from the host 100, a function of loading data into the memory 200 by simultaneously using the N number of channels while preventing the load of the host 100 from increasing may be provided. The first splitter 410 may be located outside the memory 200 or on a storage device including the memory 200. In the present specification, the first splitter 410 may be referred to as an "external splitter."

Since data by a request of the host 100 is loaded simultaneously through the N number of respective channels, data may be read simultaneously through the N number of channels even when processing data of the memory 200, and then, data processing may be performed.

Referring to FIG. 3, since data is simultaneously loaded by being split into units of the data bus width for the N number of channels by the host 100, the data by the host 100 may be data that is continuous in the horizontal direction.

The core processor 300 may perform data processing by simultaneously reading the data loaded through the N number of respective channels while simultaneously using at least two channels from among the N number of channels used by the memory 200.

For example, the core processor 300 may simultaneously access the zeroth channel Ch0, the first channel Ch1, the second channel Ch2 and the third channel Ch3. The core processor 300 may read data of the address 0 through the zeroth channel Ch0. At the same time, the core processor 300 may read data of the address 1, the address 2 and the address 3 through the first channel Ch1, the second channel Ch2 and the third channel Ch3, respectively. Also, the core processor 300 may simultaneously read data of addresses 4, 5, 6 and 7 through all the channels.

Since the core processor 300 reads and processes data while simultaneously using at least two of the N number of channels, the efficiency of a proximity data processing scheme of processing data in the vicinity of the memory 200 or the plurality of memory cells may be improved. The efficiency of using the bandwidth of the channels used by the memory 200 may be improved.

A second splitter (Splitter 2) 420 may provide physical addresses mapped to logical addresses, when reading data through the N number of channels used by the memory 200.

The second splitter 420 may check the mapping relationship between physical addresses and logical addresses on the basis of the fact that the physical addresses allocated in the first direction are converted into the logical addresses allocated in the second direction.

By the second splitter 420, data may be simultaneously read through at least two channels of the N number of channels used by the memory 200. For example, as illustrated in FIG. 3, the data of the address 0, the address 1, the address 2 and the address 3 may be simultaneously read through the zeroth channel Ch0, the first channel Ch1, the second channel Ch2 and the third channel Ch3 by the second splitter 420, respectively.

The second splitter 420 may merge data simultaneously read through at least two channels of the N number of channels. The second splitter 420 may provide the merged data to the core processor 300.

The core processor 300 may perform calculation processing on the basis of data simultaneously read by the second splitter 420. Since data processing is performed using the entire bandwidth of the channels between the core processor

300 and the memory 200, the efficiency of the proximity data processing scheme by the core processor 300 may be improved.

The second splitter 420 may be implemented, for example, in the form of a hardware logic inside or outside of the core processor 300, but embodiments of the disclosed technology are not limited thereto. The second splitter 420 may be implemented by a logic including, for example, a function of simultaneously reading data through a plurality of channels and a function of merging the simultaneously read data and providing the merged data to the core processor 300. The second splitter 420 may be located inside a storage device including the memory 200 and the core processor 300. The second splitter 420 may be provided separately from the core processor 300, and may provide a function of reading data by simultaneously using a plurality of channels without degrading the calculation processing performance of the core processor 300. Alternatively, the second splitter 420 may be included inside the core processor 300, and may be implemented as a partial function of the core processor 300. In the present specification, the second splitter 420 may be referred to as an "internal splitter," and the core processor 300 and the second splitter 420 may be collectively referred to as a "proximity data processing module 500."

In addition, the first splitter 410, which performs the function of loading data into the memory 200 by simultaneously using a plurality of channels, may also be included in the proximity data processing module 500 together with the second splitter 420.

Referring to FIG. 4A, a computing system may include a host 100 and a storage device. The storage device may include a memory 200 and a proximity data processing module 500, which is located adjacent to the memory 200 and processes data of the memory 200.

The proximity data processing module 500 may include a core processor 300, a first splitter 410 and a second splitter 420.

The core processor 300 may perform a calculation on data of the memory 200 and provide a calculation result to the host 100, under the control of the host 100.

The first splitter 410 may perform a function of loading a command, transmitted from the host 100, into the memory 200. The first splitter 410 may divide the command transmitted from the host 100 into units of a data bus width according to channels used by the memory 200. The first splitter 410 may load the divided command into the memory 200 by simultaneously using a plurality of channels used by the memory 200. The first splitter 410 may be implemented in the form of a chipset or logic separate from the core processor 300 or may be implemented in the form of a logic inside the core processor 300. The first splitter 410 may also be implemented as a partial function of the core processor 300.

Since the first splitter 410 performs the function of loading a command transmitted from the host 100 into the memory 200, if the first splitter 410 is located adjacent to the host 100 or is located adjacent to the memory 200, then the first splitter 410 may perform the function of loading data into the memory 200 without a difference in processing speed.

The second splitter 420 may read data, loaded into the memory 200, by simultaneously using the plurality of channels. The second splitter 420 may merge simultaneously read data. The second splitter 420 may provide the merged data to the core processor 300.

The second splitter 420 may be located adjacent to the memory 200 and the core processor 300, and may enable the core processor 300 to read data by simultaneously using the plurality of channels used by the memory 200, thereby improving processing performance by the core processor 300.

The first splitter 410 and the second splitter 420 may be implemented in an integrated form.

Referring to FIG. 4B, a proximity data processing module 500 included in a storage device may include, for example, a core processor 300 and an integrated splitter (Splitter_U) 430.

The integrated splitter 430 may perform functions of dividing, when a host 100 loads data into a memory 200, data of the host 100 into units of a data bus width according to channels of the memory 200 and loading the divided data into the memory 200 by simultaneously using a plurality of channels.

When the core processor 300 processes data stored in the memory 200, the integrated splitter 430 may read data by simultaneously using the plurality of channels of the memory 200, merge the read data and provide the merged data to the core processor 300.

The integrated splitter 430 may be implemented in the form of a logic that performs the above-described functions. As the size of data to be received and the size of data to be outputted may be varied, the integrated splitter 430 can simultaneously perform the function of loading data into the memory 200 and the function of reading data stored in the memory 200.

For example, when receiving data from the host 100, the integrated splitter 430 may receive data of 256 bytes, divide the received data by 64 bytes and output the divided data. When the data processing of the core processor 300 is performed according to a control signal of the host 100, the integrated splitter 430 may receive data of 64 bytes through each of the plurality of channels of the memory 200, merge the respective received data of 64 bytes and provide data of 256 bytes to the core processor 300.

As such, the computing system according to embodiments of the disclosure may include an external splitter that loads data of the host 100 into the memory 200 and an internal splitter that reads data of the memory 200 and provides the read data to the core processor 300. Through data processing by the core processor 300 adjacent to the memory 200, the data processing performance of the computing system may be improved. The external splitter may be included in the host 100, or may be included in the proximity data processing module 500 of the storage device. In some cases, the external splitter may be implemented by being integrated with the internal splitter. The internal splitter may be located in the proximity data processing module 500, and may be located adjacent to the memory 200 to provide an effect of improving data processing performance by the proximity data processing module 500.

In the process of loading data of the host 100 into the memory 200 and reading data of the memory 200, in order to simultaneously use the plurality of channels, the external splitter and the internal splitter may perform a function of converting physical addresses allocated to the plurality of channels into logical addresses or converting logical addresses into physical addresses.

Figure 5:
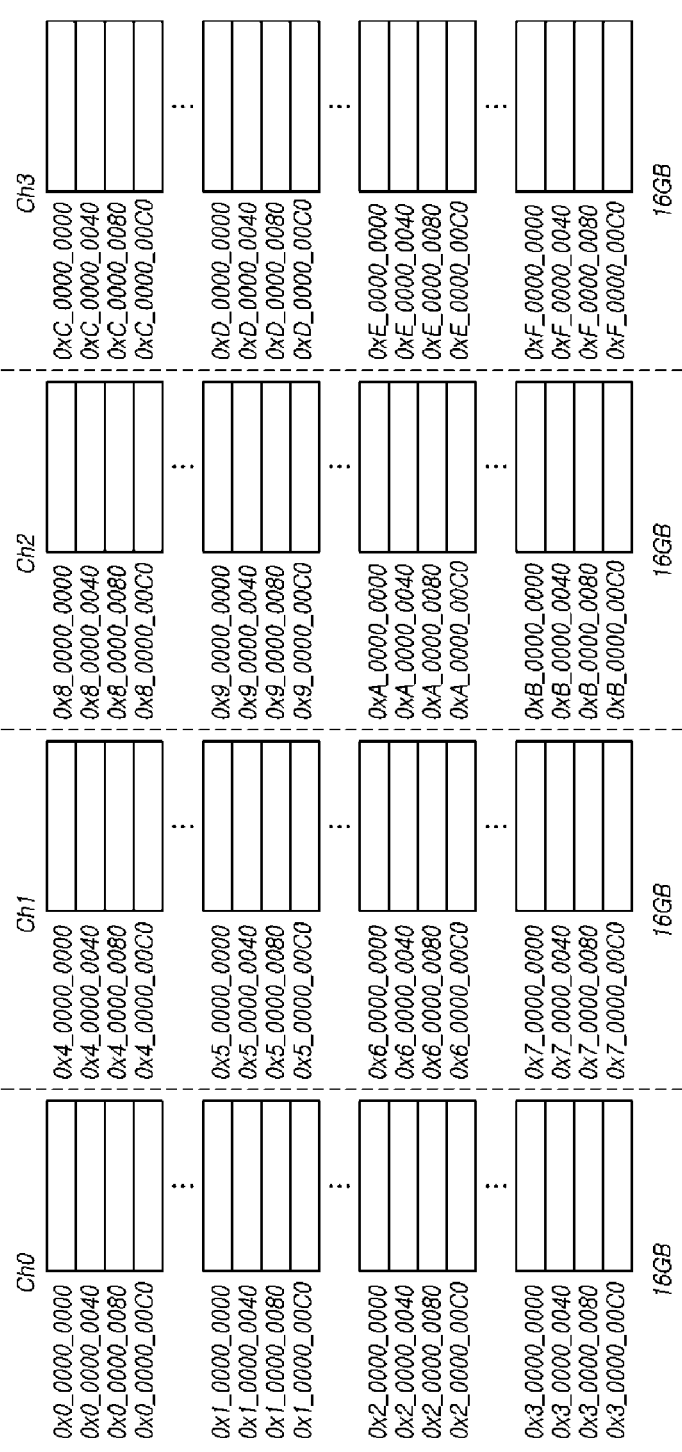
Figure 6:
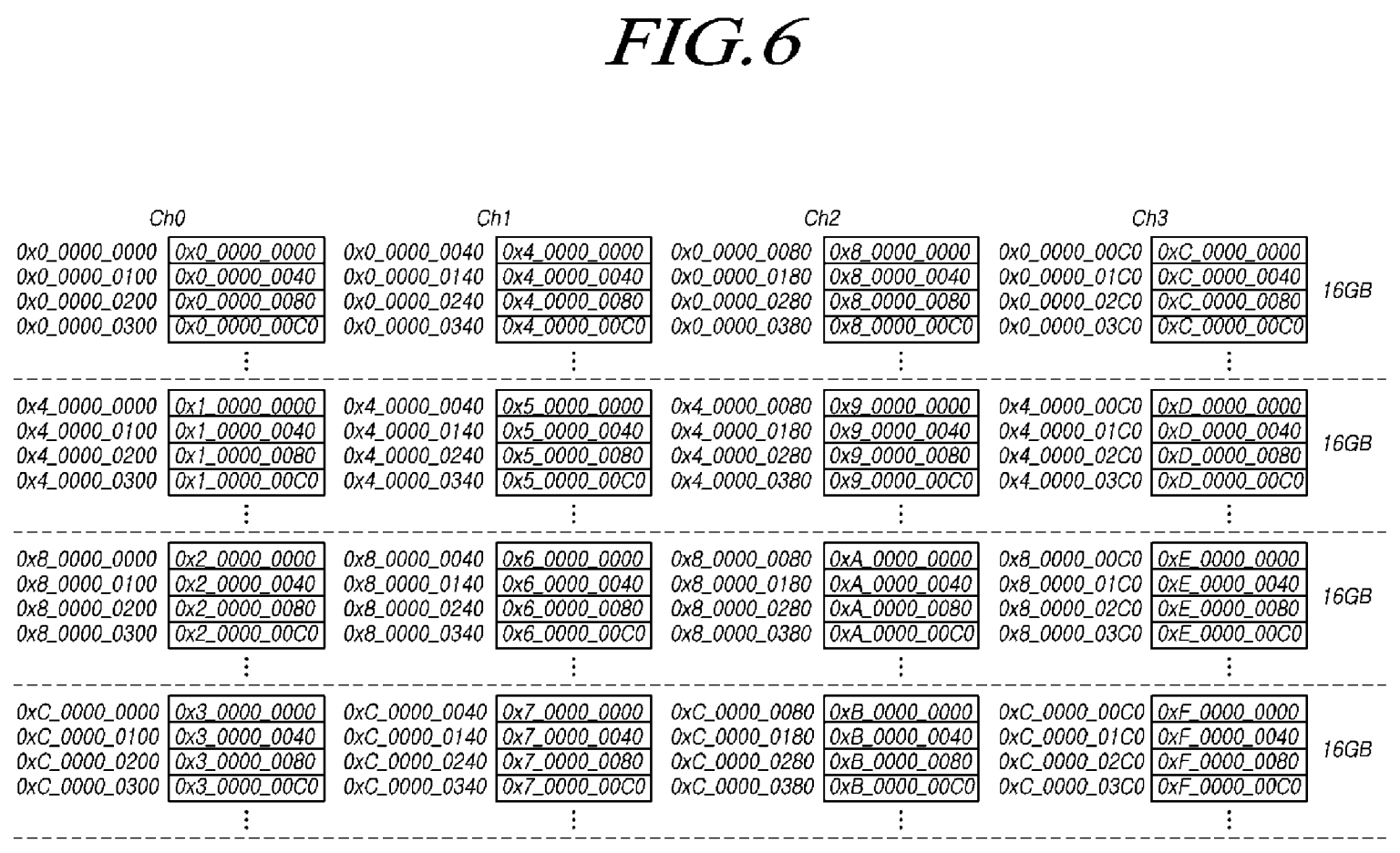

FIGS. 5 and 6 are diagrams illustrating examples of methods of mapping physical addresses and logical addresses allocated to channels used by a memory in computing systems according to embodiments of the disclosed technology.

Referring to FIG. 5, an example in which physical addresses are allocated to N number of channels, respectively, used by a memory 200 is shown.

For example, addresses 0x0_0000_0000 to 0x3_0000_00C0 may be allocated to the zeroth channel Ch0. Addresses 0x4_0000_0000 to 0x7_0000_00C0 may be allocated to the first channel Ch1. Addresses 0x8_0000_0000 to 0xB_0000_00C0 may be allocated to the second channel Ch2. Addresses 0xC_0000_0000 to 0xF_0000_00C0 may be allocated to the third channel Ch3.

As such, since physical addresses are sequentially allocated to each channel, simultaneous access to the plurality of channels by the host 100 or the core processor 300 may be difficult.

The physical addresses allocated in the vertical direction may be converted into logical addresses allocated in the horizontal direction.

Referring to FIG. 6, the physical addresses shown in FIG. 5 and allocated in the vertical direction may be converted into logical addresses allocated in the horizontal direction. For example, the addresses 0x0_0000_0000, 0x0_0000_0040, 0x0_0000_0080 and 0x0_0000_00C0 allocated to the zeroth channel CH0 in the vertical direction in FIG. 5 may be allocated to the zeroth channel Ch0, the first channel Ch1, the second channel Ch2 and the third channel Ch3, respectively, as logical addresses as shown in FIG. 6. 0x0_0000_0000, 0x4_0000_0000, 0x8_0000_0000 and 0xC_0000_0000 may be mapped to the respective logical addresses.

The core processor 300 may simultaneously access the N number of respective channels, used by the memory 200, through physical addresses mapped to the logical addresses, and may read and process data.

Data loaded into the memory 200 by the host 100 may be loaded through at least two channels. Since data is loaded by being divided into units of the data bus width of the channels used by the memory 200, when the length of the data is larger than the data bus width, the data may be loaded into at least two channels.

When logical addresses for data loaded into the memory 200 are requested, at least two physical addresses may be provided.

Figure 8:
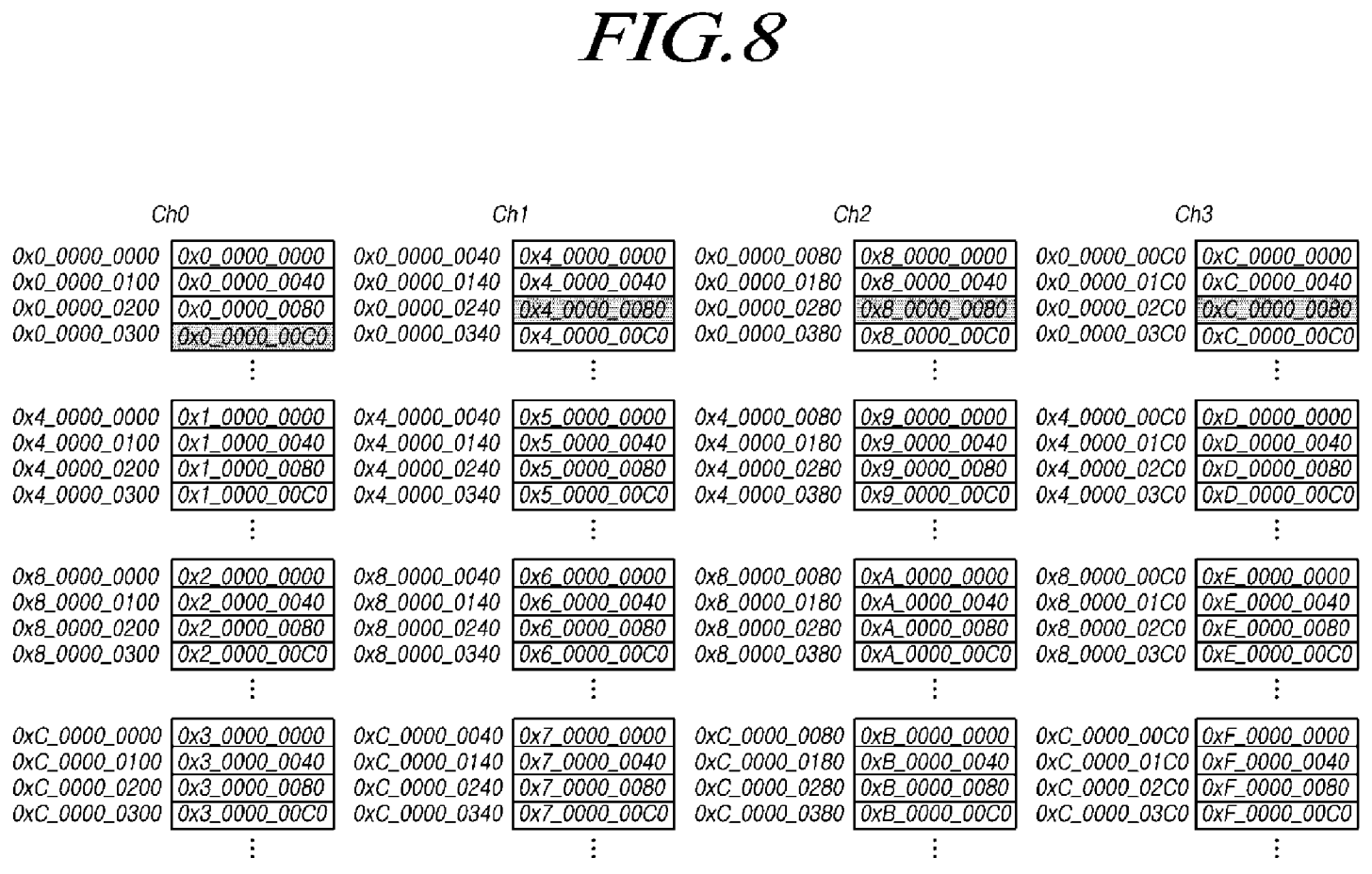

FIGS. 7 and 8 are diagrams illustrating an example of a method of processing data of a memory in a computing system based on an embodiment of the disclosure.

Referring to FIGS. 7 and 8, an example in which data (e.g., a command) loaded into a memory 200 by a host 100 is loaded into four channels by being split is shown. From the host 100, the command may be loaded into a zeroth channel Ch0, a first channel Ch1, a second channel Ch2 and a third channel Ch3 by being split.

The command loaded into the four channels by being split may be simultaneously read by a core processor 300.

In order to process the corresponding command, the core processor 300 may input 0x0_0000_0240, as a logical address allocated to the memory 200, to the memory 200. When the length of a command corresponding to a data bus width is 1, the length of the command may be inputted as 4. Data stored in areas indicated by four physical addresses may constitute one command.

In the memory 200, a physical address corresponding to the logical address 0x0_0000_0240 may be 0x4_0000_0080. Since the length of the command is 4, the memory 200 may output four consecutive physical addresses 0x4_0000_0080, 0x8_0000_0080, 0xC_0000_0080 and 0x0_0000_00C0 (see, e.g., shaded areas in FIG. 8) to the core processor 300.

Accordingly, data corresponding to 0x0_0000_00C0 allocated to the zeroth channel Ch0, 0x4_0000_0080 allocated to the first channel Ch1, 0x8_0000_0080 allocated to the second channel Ch2 and 0xC_0000_0080 allocated to the third channel Ch3 may be obtained by the core processor 300.

The core processor 300 may perform a required process by simultaneously reading four data through four channels.

Since processing is performed by simultaneously reading data through four channels, calculation speed by the core processor 300 may be improved. The efficiency of using a bandwidth between the core processor 300 and the memory 200 may be improved.

The total number of times that data is loaded into the memory 200 through all of a plurality of channels by the host 100 may be greater than 1 when a size of the data is larger than the data bus width and the data is split into units of a data bus width and loaded into the memory 200 through a plurality of channels. Since data for the same command to be loaded into the same channel may be loaded by being bundled, even when the command is larger than the data bus width, the number of times data is loaded into the memory 200 by the host 100 may be less than of the same as the number N of the channels. For example, when the number of channels is four and a size of the data for the same command is three times the data bus width, a divided data to be corresponded to the data bus width may be loaded into the memory 200 through three channels of four channels. In this case, the total number of times that the data is loaded into the memory 200 may be three, which is less than the number four of the channels. In another example, when the number of channels is four and a size of the data for the same command is five times the data bus width, a divided data to be corresponded to the data bus width may be loaded into the memory 200 through three channels of four channels. And a divided data which is two times the data bus width may be loaded into the memory 200 through rest one channels of four channels. Since the divided data which is two times the data bus width may be loaded into the memory 200 simultaneously through the rest one channels of four channels, the total number of times that the data for the same command is loaded into the memory 200 may be the same as the number four of the channels.

Figure 10:
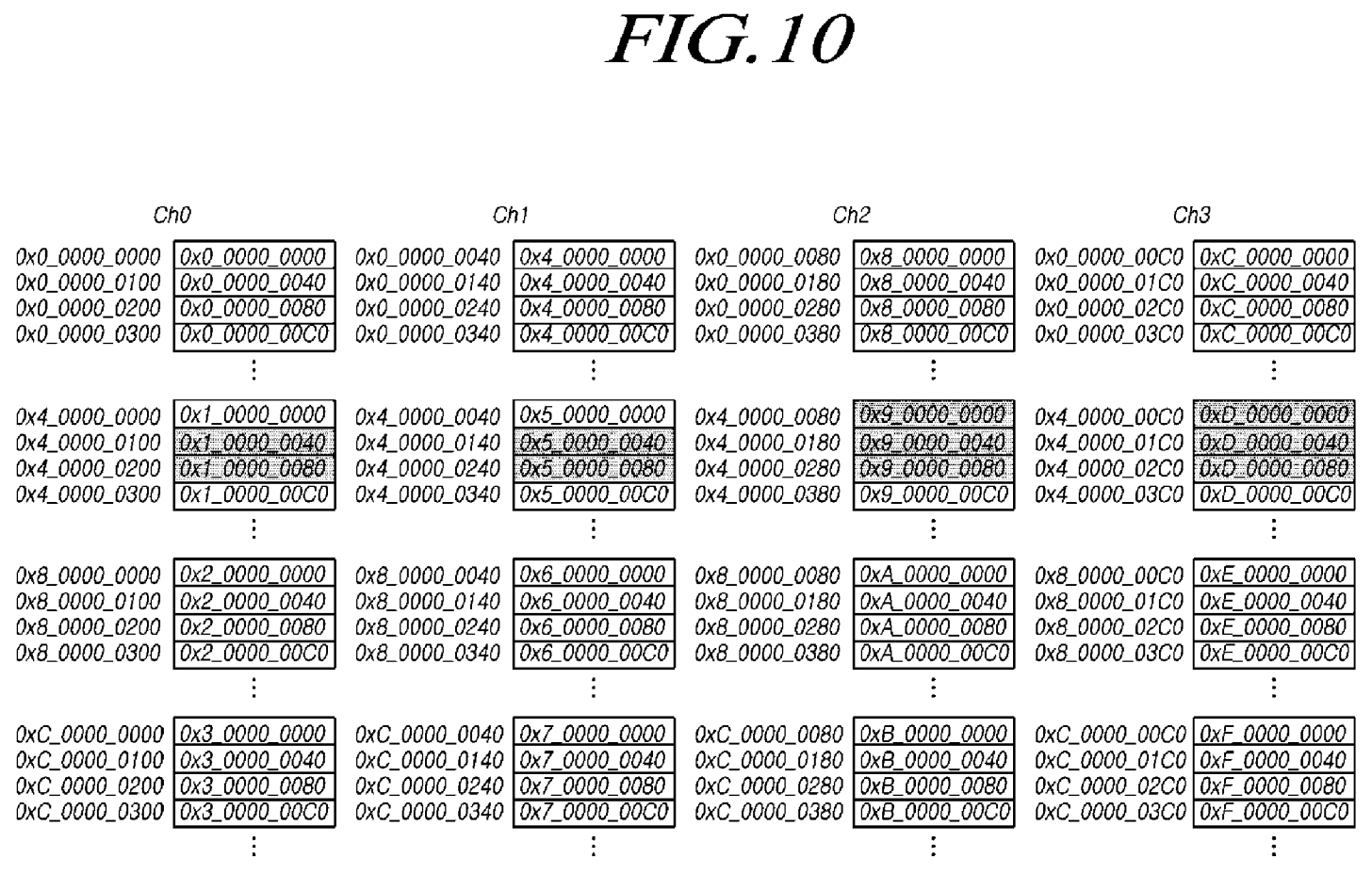

FIGS. 9 and 10 are diagrams illustrating another method of processing data of a memory in a computing system according to an embodiment of the disclosure.

Referring to FIGS. 9 and 10, a command split into units of a data bus width by the host 100 may be loaded through the plurality of channels of the memory 200.

FIGS. 9 and 10 show a command loaded into the memory 200 that is larger than the data bus width. For example, the command loaded into the memory 200 may have a length corresponding to 10 times the data bus width.

The host 100 may split the command having the length corresponding to 10 times the data bus width into units of the data bus width and load the split command through the plurality of respective channels of the memory 200.

The host 100 may bundle parts of the command to be loaded into the same channel and load the bundled parts of the command into the corresponding channel. Parts of the command to be loaded into the same channel may be two or more times the data bus width. The parts of the command which are two or more times the data bus width may be loaded into the memory 200 simultaneously through the same channel.

For example, the host 100 may split the command having the length corresponding to 10 times the data bus width into 10 data. The host 100 may check each of the plurality of channels into which the 10 data are to be loaded. The host 100 may bundle some of the 10 data to be loaded into the same channel and load the bundled data through the corresponding channel of the memory 200. The number of times the host 100 loads the command through the plurality of channels may be equal to or less than 4 as the number of the channels.

For example, data to be stored in areas indicated by 0x1_0000_0040 and 0x1_0000_0080, from among addresses allocated to the zeroth channel Ch0, may constitute a part of one command. The host 100 may simultaneously load the data to be loaded into the areas indicated by 0x1_0000_0040 and 0x1_0000_0080 through the zeroth channel Ch0.

Similarly, data to be stored in areas indicated by 0x5_0000_0040 and 0x5_0000_0080, from among addresses allocated to the first channel Ch1, may constitute a part of one command. The host 100 may simultaneously load the data to be loaded into the areas indicated by 0x5_0000_0040 and 0x5_0000_0080 through the first channel Ch1.

The numbers of data constituting parts of the same command, from among data to be loaded through the plurality of respective channels, may be different.

For example, data constituting a part of the command to be loaded into each of the second channel Ch2 and the third channel Ch3 may be stored in areas indicated by three addresses.

Data to be stored in areas indicated by 0x9_0000_0000, 0x9_0000_0040 and 0x9_0000_0080, from among addresses allocated to the second channel Ch2, may constitute a part of one command. The host 100 may simultaneously load the data to be loaded into the areas indicated by 0x9_0000_0000, 0x9_0000_0040 and 0x9_0000_0080 through the second channel Ch2.

Data to be stored in areas indicated by 0xD_0000_0000, 0xD_0000_0040 and 0xD_0000_0080, from among addresses allocated to the third channel Ch3, may constitute a part of one command. The host 100 may simultaneously load the data to be loaded into the areas indicated by 0xD_0000_0000, 0xD_0000_0040 and 0xD_0000_0080 through the third channel Ch3.

In this manner, even though the length of the command to be loaded into the memory 200 by the host 100 is larger than the total data bus width of the plurality of channels, the number of times the command is loaded into the memory 200 by the host 100 may not be larger than the number of a plurality of channels because parts of the command to be loaded into the same channel are simultaneously loaded.

Even when the command by the host 100 is loaded by being split into units of the data bus width of the channels of the memory 200, a reduction in loading efficiency by the host 100 may not be significant.

In a manner similar to the above description, the core processor 300 may read and process data by simultaneously accessing the data through the plurality of channels.

For example, the core processor 300 may input, to the memory 200, a logical address 0x4_0000_0080 mapped to a physical address that indicates an area storing first data of the command. A command may be inputted with a length corresponding to 10 times the data bus width.

Since the command is inputted with a length of 10, logical addresses as read targets in the memory 200 may be 0x4_0000_0080, 0x4_0000_00C0, . . . , 0x4_0000_0280 and 0x4_0000_02C0. Data stored in areas indicated by physical addresses mapped to the logical addresses 0x4_0000_0080, 0x4_0000_00C0, . . . , 0x4_0000_0280 and 0x4_0000_02C0 may be read.

Data stored in areas indicated by at least two physical addresses may be simultaneously read through the plurality of respective channels used by the memory 200.

For example, data stored in areas indicated by 0x1_0000_0040 and 0x1_0000_0080 may be simultaneously read through the zeroth channel Ch0. Data stored in areas indicated by 0x5_0000_0040 and 0x5_0000_0080 may be simultaneously read through the first channel Ch1. Data stored in areas indicated by 0x9_0000_0000, 0x9_0000_0040 and 0x9_0000_0080 may be simultaneously read through the second channel Ch2. Data stored in areas indicated by 0xD_0000_0000, 0xD_0000_0040 and 0xD_0000_0080 may be simultaneously read through the third channel Ch3.

As such, even though the sizes of parts of the command loaded in the plurality of respective channels are different, data constituting the command may be simultaneously read through the plurality of channels, and processing on the corresponding command may be performed. Alternatively, in some cases, data through the second channel Ch2 and the third channel Ch3 may be simultaneously read first, and data through the zeroth channel Ch0 and the first channel Ch1 may be simultaneously read.

The core processor 300 may obtain a command on the basis of data simultaneously read through the plurality of channels, and may perform data processing according to the obtained command.

Since the core processor 300 simultaneously accesses the plurality of channels used by the memory 200 and reads and processes data, data processing performance by the core processor 300 may be improved.

In addition, since a command larger than the bandwidth of all channels is simultaneously loaded in the same channels, a proximity data processing scheme, which suppresses an increase in the number of loading times even when data split into units of the data bus width of each channel is loaded and enables simultaneous processing by the core processor 300, may be provided.

Figure 11:
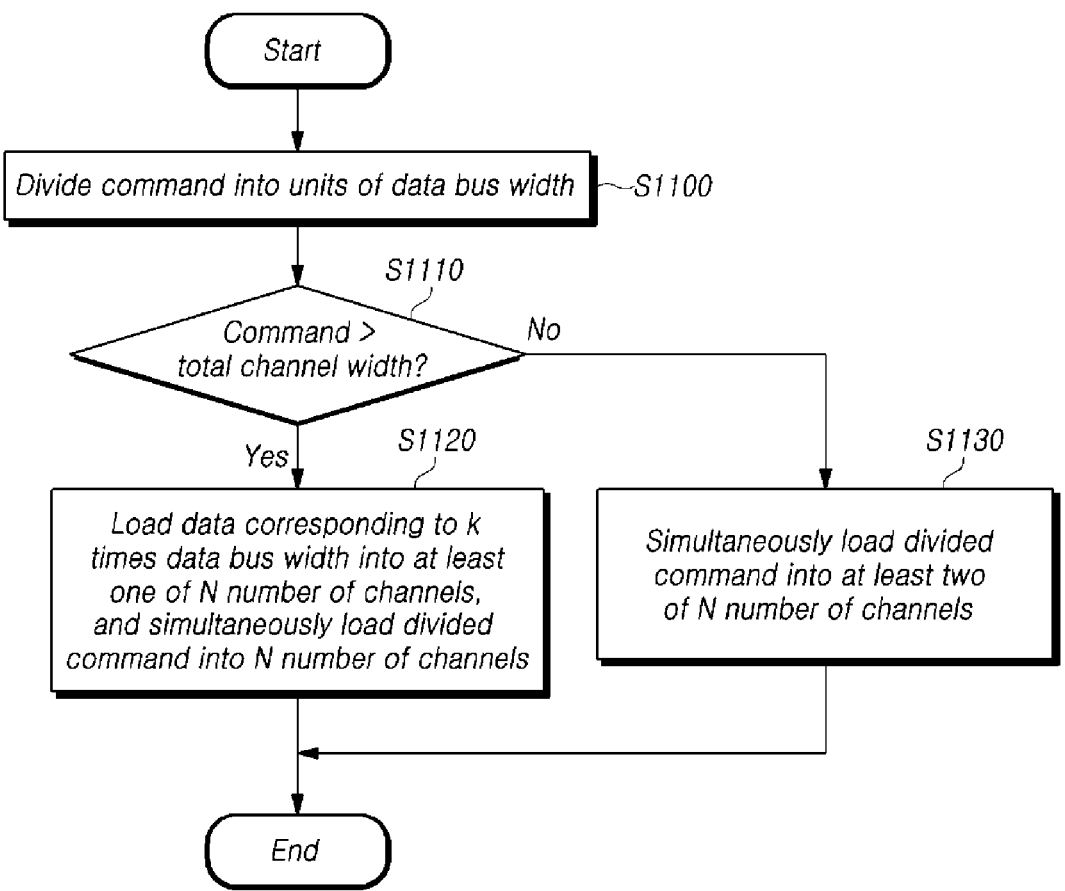
FIG. 11 is a diagram illustrating a method of loading data in a computing system according to an embodiment of the disclosure.
Figure 12:
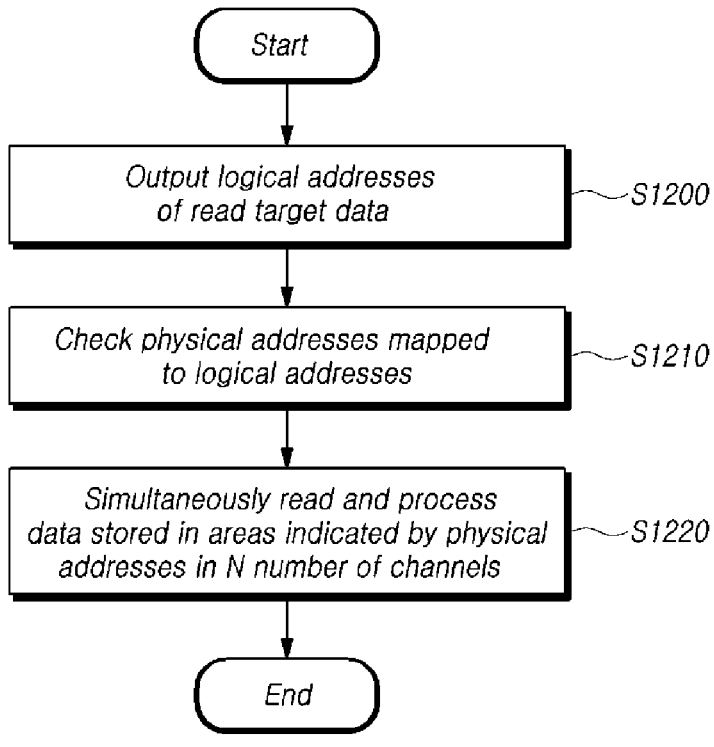
FIG. 12 is a diagram illustrating a method of processing data in a computing system according to an embodiment of the disclosure.

FIG. 11 is a diagram illustrating a method of loading data in a computing system according to an embodiment of the disclosure. FIG. 12 is a diagram illustrating a method of processing data in a computing system according to an embodiment of the disclosure.

Referring to FIG. 11, a host 100 may divide a command to be loaded into a memory 200 into units of a data bus width of each of N number of channels used by the memory 200 (S1100).

The host 100 may check whether the total length of the command is equal to or larger than the total width of the N number of channels used by the memory 200 (S1110).

When the command has a length larger than the total channel width, the host 100 may split the command into units of the data bus width of each channel. The host 100 may bundle and transmit simultaneously data to be stored in each channel among the divided data. The host 100 may load data corresponding to two or more times the data bus width into at least one of the N number of channels, and may simultaneously load data corresponding to parts of the split command into the N number of channels (S1120).

When the command has a length equal to or smaller than the total channel width, the host 100 may simultaneously load the split command into at least two of the N number of channels (S1130).

Data may be loaded into the memory 200 by the host 100 to improve data processing efficiency by the core processor 300.

The core processor 300 may simultaneously read data, loaded into the memory 200, through at least two channels and process the simultaneously read data.

Referring to FIG. 12, a core processor 300 may output logical addresses of data as a target to be read (S1200).

In response to the output of the core processor 300, the memory 200 may output physical addresses mapped to the logical addresses. The core processor 300 may check the physical addresses mapped to the logical addresses (S1210).

The core processor 300 may simultaneously read data stored in areas indicated by the physical addresses together with the physical addresses through the N number of respective channels (S1220). The core processor 300 may perform necessary calculation processing using the simultaneously read data.

Since the core processor 300 located adjacent to the memory 200 reads and processes data by using all of the N number of channels used by the memory 200, the efficiency of a proximity data processing scheme by the core processor 300 may be improved.

Although various embodiments of the disclosed technology have been described with particular specifics and varying details for illustrative purposes, those skilled in the art will appreciate that various modifications, additions and substitutions may be made based on what is disclosed or illustrated in the present disclosure without departing from the spirit and scope of the present disclosure as defined in the following claims.

What is claimed is:

1. A storage device comprising:
a memory including a plurality of memory cells;
a core processor located adjacent to the plurality of memory cells, and configured to access the memory using an N (where N is an integer equal to or greater than 2) number of channels and to process data of the memory; and
an internal splitter configured to simultaneously read data through at least two channels from among the N number of channels, to merge the simultaneously read data, and to provide the merged data to the core processor, and
wherein the internal splitter converts logical addresses to physical addresses, the physical addresses are allocated sequentially for each of the N number of channels, and the logical addresses are allocated in a different direction from the physical addresses, and are allocated sequentially for all of the N number of channels, and
wherein each of the read data in the N number of channels has a physical address corresponding to a logical address.

2. The storage device according to claim 1, wherein the internal splitter provides physical addresses that are mapped to logical addresses sequentially allocated to the N number of channels and that are sequentially allocated to the N number of respective channels.

3. The storage device according to claim 1, wherein the data is split into units of a data bus width of each of the number of channels and is loaded into the memory through the N number of channels.

4. The storage device according to claim 1, wherein, when the data is loaded into the memory, physical addresses that are allocated in a first direction for each of the N number of channels are converted into logical addresses that are allocated in a second direction different from the first direction.

5. The storage device according to claim 1, wherein at least two data simultaneously loaded through at least two channels from among the N number of channels configure a command.

6. The storage device according to claim 1, wherein at least two data loaded through any one channel from among the N number of channels configure a part of a command.

7. The storage device according to claim 1, wherein
a first data simultaneously loaded through a first channel from among the N number of channels and a second data simultaneously loaded through a second channel configure a part of a command, and
at least one of the first data or the second data is larger than a data bus width of each of the N number of channels.

8. The storage device according to claim 7, wherein a size of the first data is different from a size of the second data.

9. The storage device according to claim 1, wherein, when a command is loaded into the memory, the number of times the N number of channels are accessed is equal to or less than N.

10. The storage device according to claim 1, wherein the core processor is located outside the memory.

11. The storage device according to claim 1, wherein the core processor is located inside the memory.

12. The storage device according to claim 1, wherein the core processor is separate from a host which is located outside the memory.

13. A computing system comprising:
a memory using N (where N is an integer equal to or greater than 2) number of channels;
a first splitter configured to, when data is loaded into the memory, convert physical addresses, which are allocated sequentially for each of the N number of channels, into logical addresses that are allocated in a different direction from the physical addresses and are allocated sequentially for all of the N number of channels; and
a second splitter configured to, when the data loaded into the memory is read, provide physical addresses mapped to the logical addresses,
wherein each of the read data in the N number of channels has a physical address corresponding to a logical address.

14. The computing system according to claim 13, wherein the second splitter provides the physical addresses mapped to the logical addresses to at least two channels, respectively, from among the N number of channels.

15. The computing system according to claim 13, wherein the data is simultaneously loaded into at least two of the N number of channels by the first splitter, and the data is simultaneously read from at least two of the N number of channels by the second splitter.

16. The computing system according to claim 13, wherein the second splitter is located inside the memory or adjacent to the memory, and the first splitter is located outside the memory.

17. The computing system according to claim 13, wherein the first splitter and the second splitter are located inside the memory or adjacent to the memory.

18. A proximity data processing module comprising:
an internal splitter configured to provide physical addresses mapped to logical addresses for each of a plurality of channels used by a memory; and
a core processor configured to read data of the memory simultaneously using the plurality of channels according to the physical addresses, and to perform a calcu-
lation according to the data, and wherein the internal splitter converts the logical addresses
to the physical addresses, the physical addresses are
allocated sequentially for each of an N number of
channels, and the logical addresses are allocated in a
different direction from the physical addresses, and are
allocated sequentially for all of the N number of
channels, and wherein each of the read data in the N number of channels
has a physical address corresponding to a logical
address.

19. The proximity data processing module according to
claim 18, wherein the physical addresses are sequentially
allocated to the plurality of respective channels.

20. The proximity data processing module according to
claim 18, wherein the logical addresses, generated as the
physical addresses that are allocated in a first direction, are
converted to be allocated in a second direction different from
the first direction.

* * * * *